(12) United States Patent
Lee

(10) Patent No.: US 7,987,965 B2
(45) Date of Patent: Aug. 2, 2011

(54) ASSEMBLY DEVICE

(75) Inventor: Chia-En Lee, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 397 days.

(21) Appl. No.: 12/334,633

(22) Filed: Dec. 15, 2008

(65) Prior Publication Data

US 2009/0159398 A1    Jun. 25, 2009

(30) Foreign Application Priority Data

Dec. 21, 2007 (CN) .......................... 2007 1 0203341

(51) Int. Cl.
*B65G 15/44* (2006.01)

(52) U.S. Cl. ..................................... 198/484.1; 198/952

(58) Field of Classification Search ............... 198/478.1, 198/484.1, 867.01, 803.11, 818, 836.2, 952
See application file for complete search history.

(56) References Cited

U.S. PATENT DOCUMENTS

| | | | | |
|---|---|---|---|---|
| 2,666,404 | A | * | 1/1954 | Kessler .......................... 110/329 |
| 4,227,448 | A | * | 10/1980 | Ronning .......................... 99/489 |
| 4,475,468 | A | * | 10/1984 | Ishikawa et al. .............. 110/257 |
| 5,201,823 | A | * | 4/1993 | Pazdernik .................. 198/419.3 |
| 5,271,316 | A | * | 12/1993 | Wisting .......................... 99/420 |
| 5,651,191 | A | * | 7/1997 | Walunas et al. ................. 34/236 |
| 5,653,044 | A | * | 8/1997 | Thom, Jr. ........................ 34/217 |
| 5,782,337 | A | * | 7/1998 | Langland .................. 198/803.1 |
| 6,260,690 | B1 | * | 7/2001 | Batzer ........................ 198/626.5 |

* cited by examiner

*Primary Examiner* — Douglas Hess
(74) *Attorney, Agent, or Firm* — Steven M. Reiss

(57) ABSTRACT

An assembly device (20) used in assembling portable electronic devices is provided. The assembly device (20) includes a support, a transmission belt (24) moveably mounted on the support and several fans (25) rotatably mounted on the transmission belt (24) for dissipating heat in the area of the transmission belt (24).

7 Claims, 6 Drawing Sheets

ASSEMBLY DEVICE

BACKGROUND

1. Field of the Invention

The present invention relates to assembly devices and, particularly, to an assembly device with temperature regulation.

2. Description of Related Art

Portable electronic devices such as mobile phones and notebooks are widely used.

A portable electronic device is typically assembled by placing its component parts on an assembly device, where they are assembled in a predetermined order. However, the assembly device may generate substantial heat during usage and the heat may be transferred to the portable electronic device on the assembly device, thereby influencing performance of the assembled portable electronic device and shortening the lifespan of the assembly device. Generally, heat dissipating devices are used to solve the above-mentioned problems.

However, heat dissipating devices not only consume lots of power, but also takes up manufacturing space.

Therefore, there is room for improvement within the art.

BRIEF DESCRIPTION OF THE DRAWINGS

Many aspects of the assembly device can be better understood with reference to the following drawings. These drawings are not necessarily drawn to scale, the emphasis instead being placed upon clearly illustrating the principles of the present assembly device. Moreover, in the drawings like reference numerals designate corresponding parts throughout the several views.

DETAILED DESCRIPTION OF EMBODIMENTS

Figure 1:
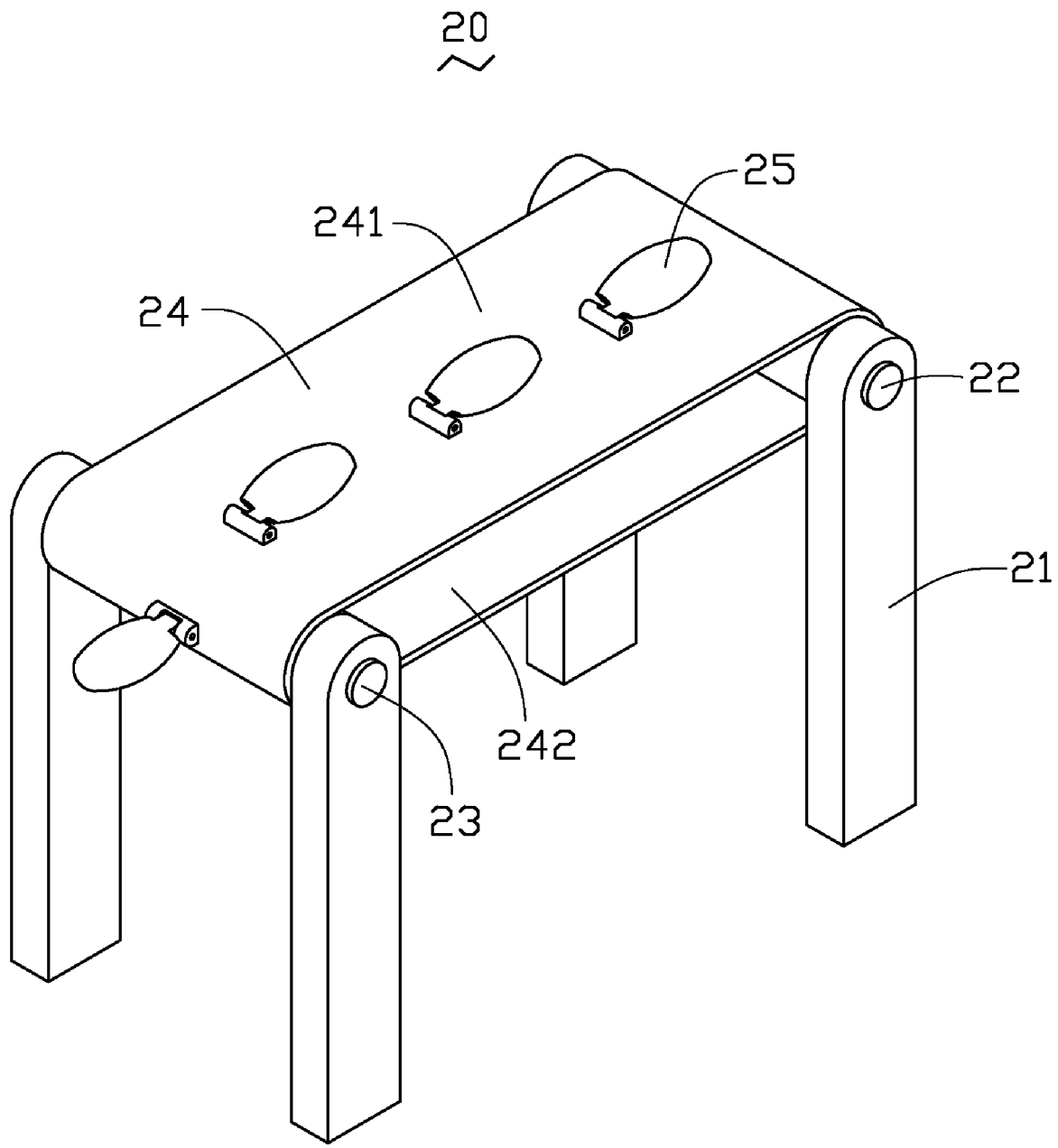
FIG. 1 is an isometric view of an assembly device, according to an exemplary embodiment.

FIG. 1 shows an exemplary assembly device 20. The assembly device 20 includes a plurality, e.g., four, supports, e.g., legs 21, a driven roller 22, a passive roller 23, a transmission belt 24 and a plurality of fans 25.

One end of each leg 21 defines a hole (not labeled). The four legs 21 are connected to the four corners of the assembly device 20 and configured to support the assembly device 20.

The driven roller 22 is rotatably mounted in holes of two of the four legs 21. The driven roller 22 is connected to a conventional driving device (not show). The driving device drives the driven roller 22 to rotate. The passive roller 23 is rotatably mounted in holes of the other two legs 21.

The transmission belt 24 is securely wrapped around the driven roller 22 and the passive roller 23, thus forming a movable outer surface 241 and an inner space 242. The transmission belt 24 is used to carry and move parts of electronic devices (not shown) on the outer surface 241 as the driven roller 22 rotates.

Figure 2:
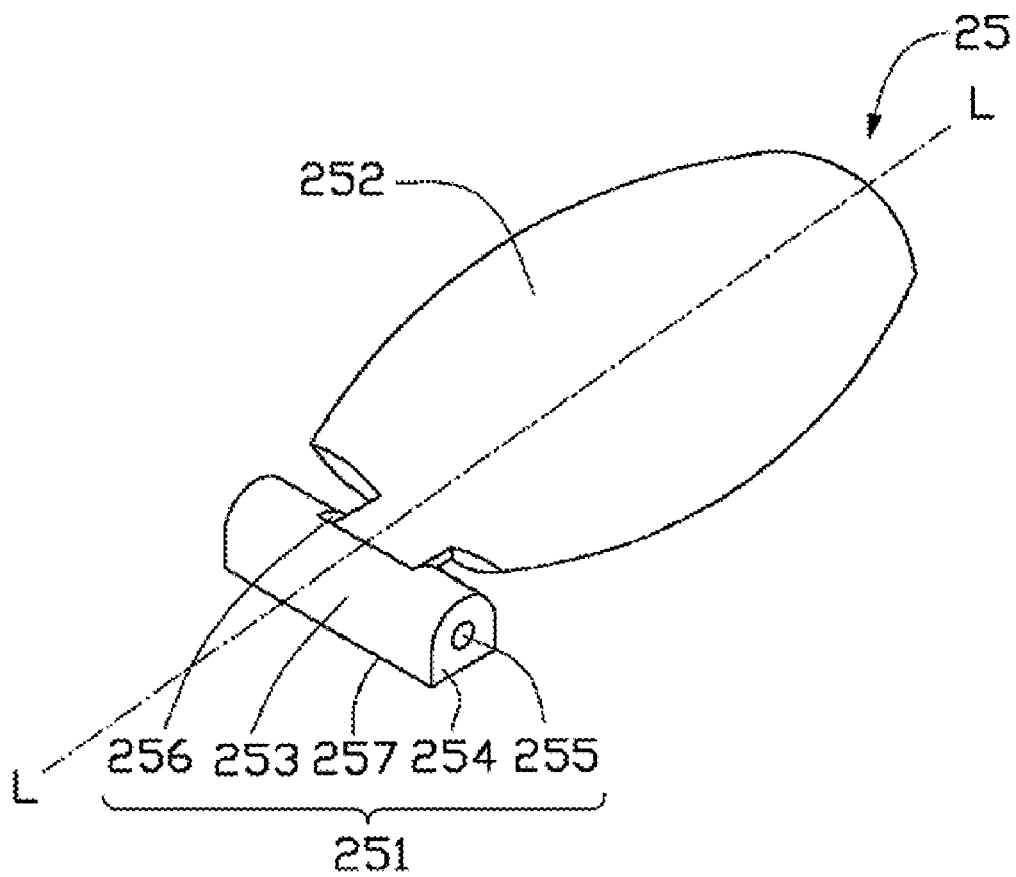
FIG. 2 is an isometric view of the fan shown in FIG. 1.
Figure 3:
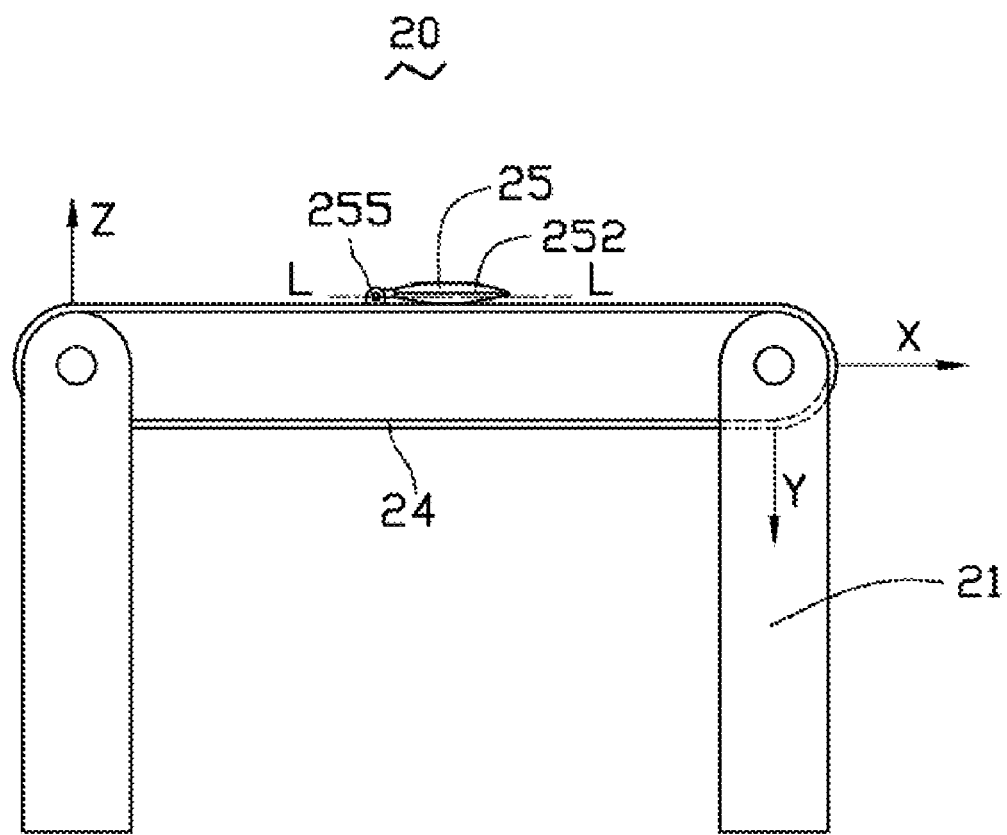
FIG. 3 is a side view of a fan showing the first state on the assembly device shown in FIG. 1.
Figure 4:
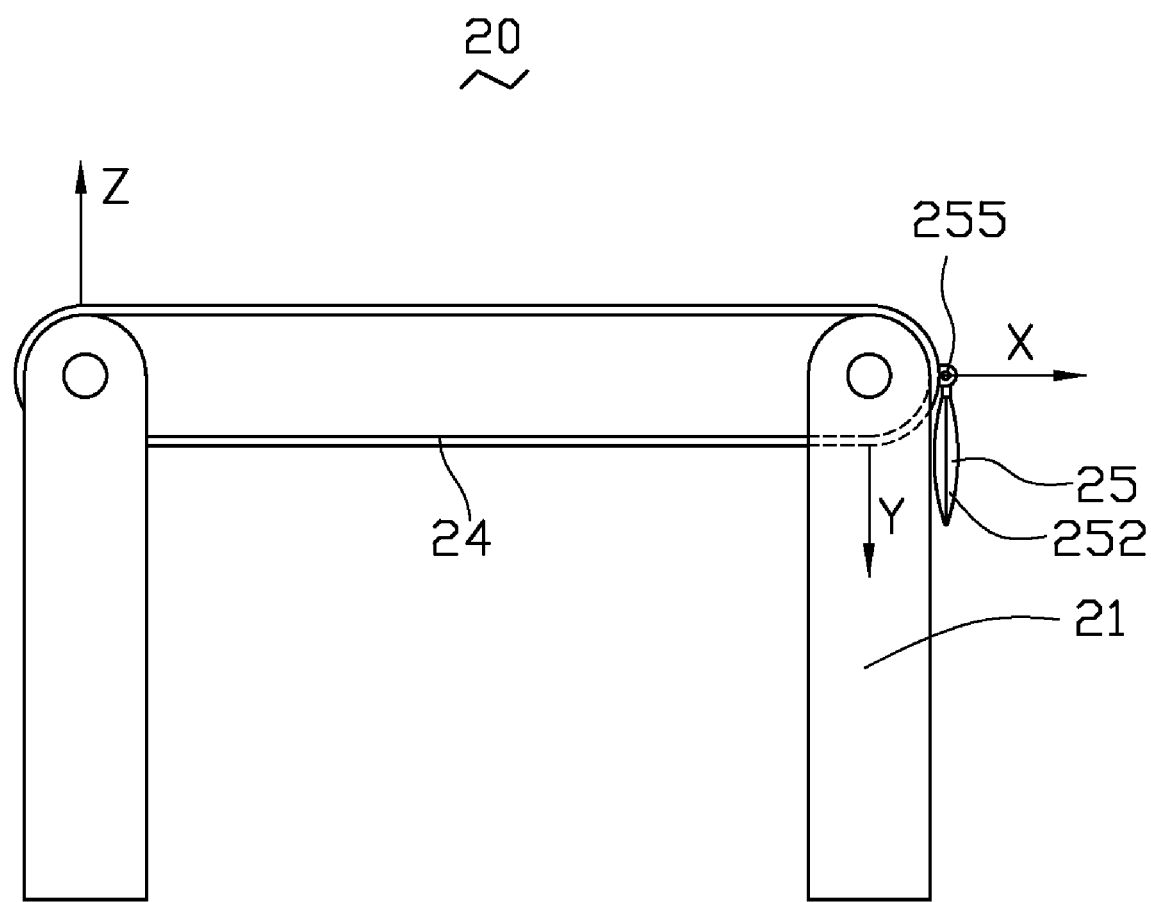
FIG. 4 is a side view of a fan showing the second state on the assembly device shown in FIG. 1.
Figure 5:
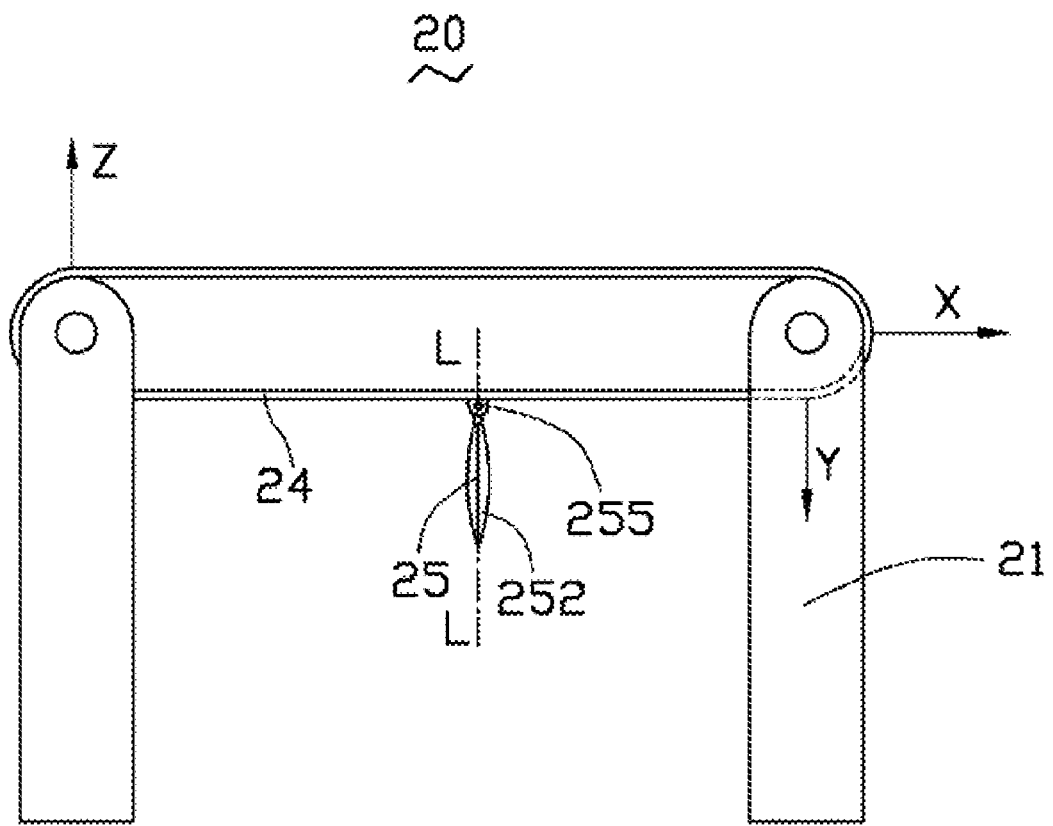
FIG. 5 is a side view of a fan showing the third state on the assembly device shown in FIG. 1.
Figure 6:
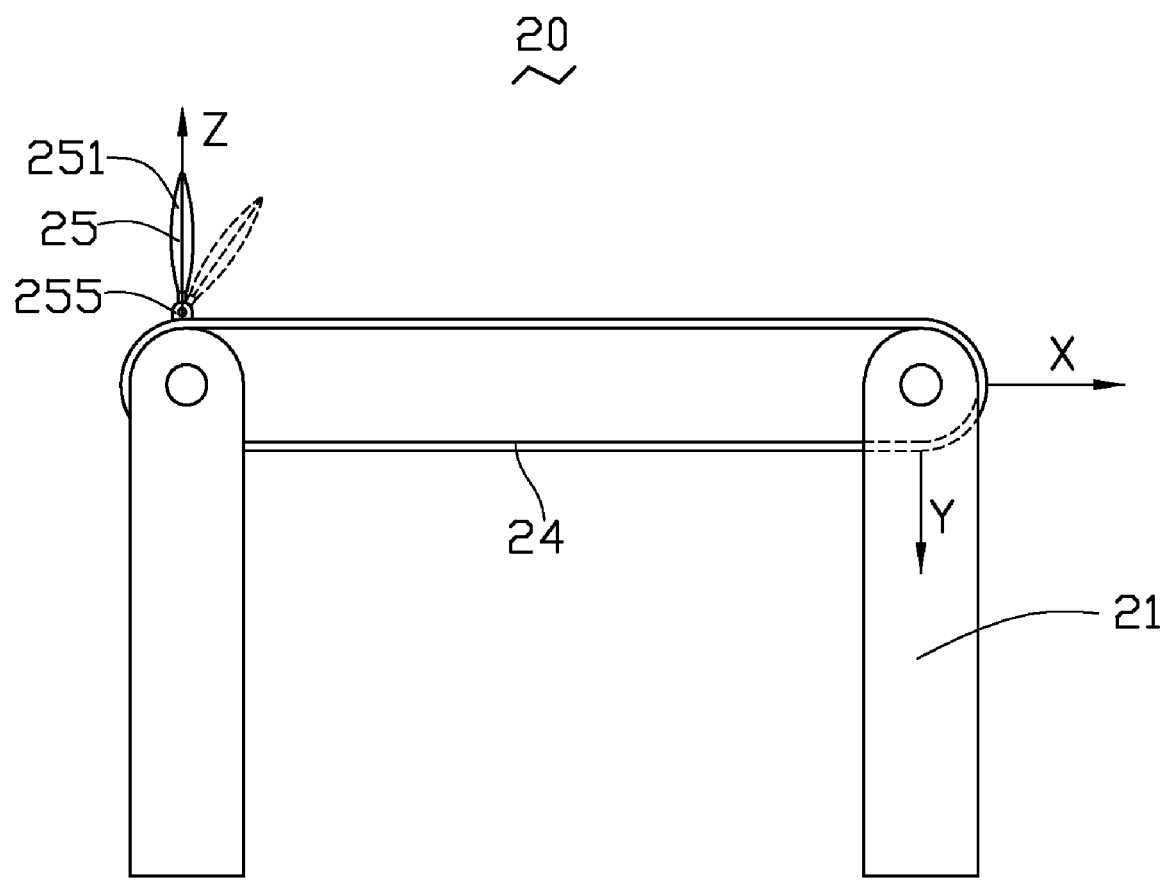
FIG. 6 is a side view of a fan showing the fourth state on the assembly device shown in FIG. 1

Referring to FIG. 2, the fans 25 are rotatably mounted on the outer surface 241 of the transmission belt 24. Each fan 25 includes a securing portion 251 and a plate 252 rotatably connected to the securing portion 251. The securing portion 251 is hollow, including a peripheral outer wall 253, two side end walls 254 and a bottom wall 257. A hinge 255 is associated with the two side end walls 254 and the securing portion 251. The peripheral outer wall 253 defines an opening 256. One end of the plate 252 is pivotally connected to the hinge 255 through the opening 256. The opening 256 allows the plate 252 to pivot the hinge 255 only from an orientation where the fan 25 is generally perpendicular to the outer surface 241 to another orientation where the fan 25 is generally parallel with the outer surface 241. The plate 252 is a flat plate having a surface area large enough for contacting and substantially moving surrounding air, and made of a strong but light material.

In assembly, the driven roller 22 and the passive roller 23 are mounted on the legs 21. The transmission belt 24 is wrapped around and tightly secured to the driven roller 22 and the passive roller 23. The securing portion 251 is fixed to the outer surface 241 of the transmission belt 24. The opening 256 faces the forward direction of the movement of the transmission belt 24. The driven roller 22 is connected to the driving device.

Referring to FIGS. 3 through 6, to illustrate the action of the fans 25, the right end of the driven roller 22 is designated X position indicated by arrow X, the lowest end of the driven roller 22 is designated Y position indicated by arrow Y, and the top end of the passive roller 23 is designated Z position indicated by arrow Z.

During operation of the assembly device 20, the driving device drives the driven roller 22 to rotate, and then the driven roller 22 and the transmission belt 24 drives the passive roller 23 to rotate. One of the fans 25 moves to X position. Then the plate 252 of the fan 25 in the X position rotates about the hinge 255 until this fan 25 moves to Y position where the plate 252 freely hangs from the transmission belt 24. As this fan 25 continues moving forward with the transmission belt 24, the surfaces of its plate 252 cause air circulation. The surface areas of the plates 252 should be large enough that the air circulation that they create dissipates heat to lower the temperature of the transmission belt 24 as well as the air in the area of the transmission belt 24. When this fan 25 moves to the Z position, this fan 25 rotates around the hinge 255 by inertia until the plate 252 of the fan 25 is generally parallel with the outer surface 241 of the transmission belt 24. Thus, this fan 25 returns to its beginning position and can repeat the previous movements while other the other fans 25 rotatably mounted on the outer surface of the transmission belt 24 sequentially cycle through the various positions (e.g. X, Y, Z).

Due to the movement of the transmission belt 24, fans 25 create, accelerate, and circulate airflow, and the airflow dissipates heat and lowers the temperature of the transmission belt 24 and the air in the area of the transmission belt 24, without additional electricity or space.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms, in which the appended claims are expressed.

What is claimed is:

1. An assembly device, comprising:
   a support;
   a transmission belt being moveably mounted on the support and having first and second linear belt portions; and
   a plurality of fans being rotatably mounted on the transmission belt, each fan including a securing portion and a plate rotatably connected to the securing portion, each plate having a longitudinal axis;
   wherein when a fan moves along a first linear belt portion, the longitudinal axis of the plate is substantially parallel to the first linear belt portion; and
   wherein when a fan moved along a second linear belt portion, the longitudinal axis of the plate is substantially perpendicular to the second linear belt portion.

2. The assembly device as claimed in claim 1, wherein the securing portion is hollow, including a peripheral outer wall, two side end walls and a bottom wall.

3. The assembly device as claimed in claim 2, wherein the peripheral wall defines an opening configured to allow the plate to pivot from an orientation where the fan is generally perpendicular to a portion of the belt to another orientation where the fan is generally parallel with the portion of the belt.

4. The assembly device as claimed in claim 3, wherein a hinge is associated with the two side end walls and accommodated in the securing portion, one end of the plate is pivoted to the hinge through the opening.

5. The assembly device as claimed in claim 4, wherein the support includes four legs positioned at four corners thereof, and the driven roller and the passive roller are mounted on the legs.

6. The assembly device as claimed in claim 1 wherein the plate is a flat plate with a surface area large enough that the plate causes an air circulation that dissipates heat to lower the temperature of the air in the area of the transmission belt.

7. The assembly device as claimed in claim 1, further including a driven roller, a passive roller, the driven roller and the passive roller are mounted on both ends of the support, the transmission belt is securely wrapped around the driven roller and the passive roller.

* * * * *